US012688852B2

(12) United States Patent
Bhattacharyya et al.

(10) Patent No.: US 12,688,852 B2
(45) Date of Patent: Jul. 21, 2026

(54) SYSTEM AND METHOD FOR VOICE BASED CONTROLLING A TELE-ROBOT IN A MULTI-USER TELEPRESENCE SESSION

(71) Applicant: Tata Consultancy Services Limited, Mumbai (IN)

(72) Inventors: Abhijan Bhattacharyya, Kolkata (IN); Ashis Sau, Kolkata (IN); Suraj Kumar Mahato, Kolkata (IN); Snehasis Banerjee, Kolkata (IN); Madhurima Ganguly, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 17 days.

(21) Appl. No.: 19/004,554

(22) Filed: Dec. 30, 2024

(65) Prior Publication Data

US 2025/0218438 A1 Jul. 3, 2025

(30) Foreign Application Priority Data

Jan. 2, 2024 (IN) ............................. 202421000152

(51) Int. Cl.
*G10L 15/00* (2013.01)
*G10L 15/22* (2006.01)
(Continued)

(52) U.S. Cl.
CPC .............. *G10L 15/22* (2013.01); *G10L 15/30* (2013.01); *H04L 65/1108* (2022.05); *G10L 2015/223* (2013.01)

(58) Field of Classification Search
CPC ... G10L 15/22; G10L 15/30; G10L 2015/223; H04L 65/1108; B25J 9/1689;
(Continued)

(56) References Cited

U.S. PATENT DOCUMENTS 9,043,208 B2 * 5/2015 Koch ...................... G10L 15/30
704/251
9,079,311 B2 * 7/2015 Wang ...................... G16H 40/67
(Continued)

OTHER PUBLICATIONS

Du et al., "Human-Robot Collaborative Control in a Virtual-Reality-Based Telepresence System," International Journal of Social Robotics (2020).

(Continued)

*Primary Examiner* — Masud Ahmed
(74) *Attorney, Agent, or Firm* — Finnegan, Henderson, Farabow, Garrett & Dunner, LLP

(57) ABSTRACT

Complexity of voice based control of tele-robots increases when used in collaborative multi-presence systems, as tele-robot fail to differentiate between operator and observers, and hence may end up executing command from wrong person. Further, the tele-robot ends up losing energy as it listens continuously to speech from multiple people, which may or may not contain commands. Embodiments disclosed herein provide a telepresence system in which an Automatic Speech Recognition (ASR) component hosted on a cloud receives and processes speech signals, infers commands, and only the inferred commands are transmitted to the tele-robot, thereby causing energy saving at the tele-robot end as it doesn't have to listen to all the speech from all the operator and observers for the execution of the voice based navigation control command. Further, a dedicated channel is established between the operator at any instance and the tele-robot, enabling direct communication between the operator and the tele-robot.

19 Claims, 7 Drawing Sheets

(51) Int. Cl.
*G10L 15/30* (2013.01)
*H04L 65/1108* (2022.01)

(58) Field of Classification Search
CPC . B25J 11/0005; B25J 13/003; G05D 2105/34;
G05D 2107/63; G05D 2109/10; G05D
1/2285; G06F 3/167
See application file for complete search history.

(56) References Cited

U.S. PATENT DOCUMENTS

| | | | |
|---|---|---|---|
| 11,348,269 B1 * | 5/2022 | Ebrahimi Afrouzi ... | G01S 17/48 |
| 12,288,566 B1 * | 4/2025 | Ganguly ............. | G10L 21/0264 |
| 12,456,469 B1 * | 10/2025 | Ganguly ............. | G06V 40/161 |
| 2014/0277735 A1 * | 9/2014 | Breazeal ................ | B25J 9/0003 |
| | | | 700/259 |
| 2024/0004391 A1 * | 1/2024 | Galluzzo ............. | G06Q 10/087 |

OTHER PUBLICATIONS

Yumak et al. "Modelling Multi-Party Interactions among Virtual Characters, Robots and Humans," (2014).

* cited by examiner

200

208

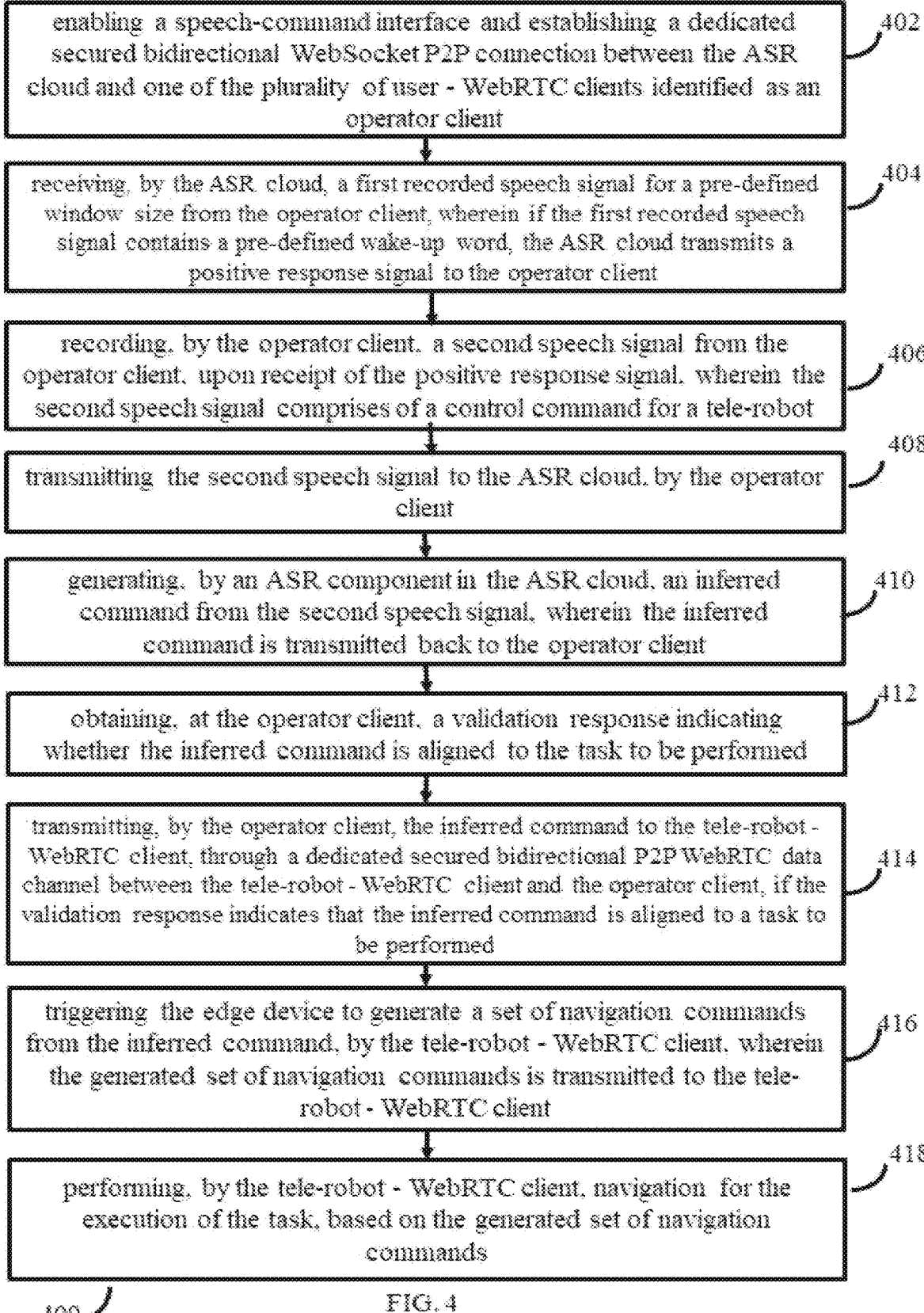

enabling a speech-command interface and establishing a dedicated secured bidirectional WebSocket P2P connection between the ASR cloud and one of the plurality of user - WebRTC clients identified as an operator client   402 receiving, by the ASR cloud, a first recorded speech signal for a pre-defined window size from the operator client, wherein if the first recorded speech signal contains a pre-defined wake-up word, the ASR cloud transmits a positive response signal to the operator client   404 recording, by the operator client, a second speech signal from the operator client, upon receipt of the positive response signal, wherein the second speech signal comprises of a control command for a tele-robot   406 transmitting the second speech signal to the ASR cloud, by the operator client   408 generating, by an ASR component in the ASR cloud, an inferred command from the second speech signal, wherein the inferred command is transmitted back to the operator client   410 obtaining, at the operator client, a validation response indicating whether the inferred command is aligned to the task to be performed   412 transmitting, by the operator client, the inferred command to the tele-robot - WebRTC client, through a dedicated secured bidirectional P2P WebRTC data channel between the tele-robot - WebRTC client and the operator client, if the validation response indicates that the inferred command is aligned to a task to be performed   414 triggering the edge device to generate a set of navigation commands from the inferred command, by the tele-robot - WebRTC client, wherein the generated set of navigation commands is transmitted to the tele-robot - WebRTC client   416 performing, by the tele-robot - WebRTC client, navigation for the execution of the task, based on the generated set of navigation commands   418

400

FIG. 4 recording a voice message containing one of a) 'yes' and b) 'no', by the operator client

502 transmitting, by the operator client, the recorded voice message to the ASR cloud

504 receiving, from the ASR cloud, a text message with one of 'yes' and 'no' inferred from the voice message, wherein the text message is the validation response

506

500

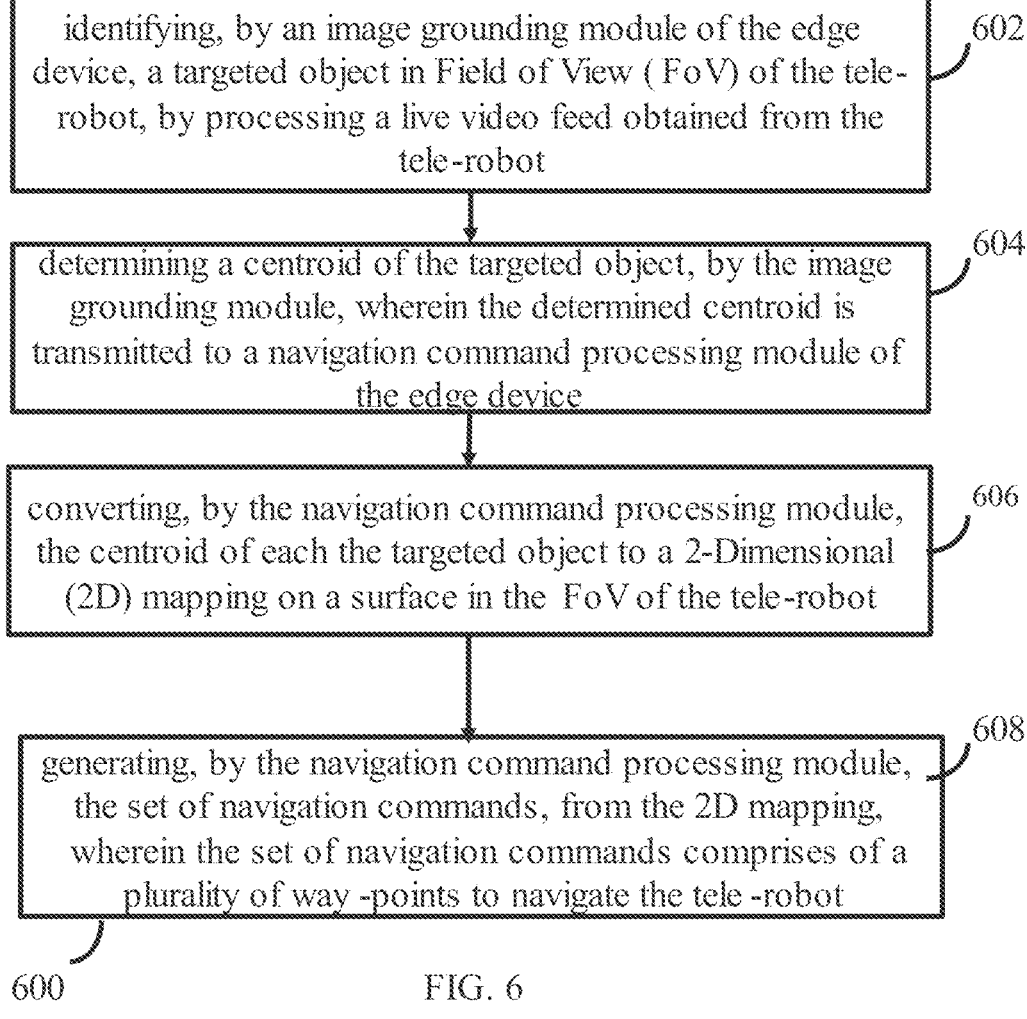

identifying, by an image grounding module of the edge device, a targeted object in Field of View ( FoV) of the tele-robot, by processing a live video feed obtained from the tele-robot    602 determining a centroid of the targeted object, by the image grounding module, wherein the determined centroid is transmitted to a navigation command processing module of the edge device    604 converting, by the navigation command processing module, the centroid of each the targeted object to a 2-Dimensional (2D) mapping on a surface in the FoV of the tele-robot    606 generating, by the navigation command processing module, the set of navigation commands, from the 2D mapping, wherein the set of navigation commands comprises of a plurality of way -points to navigate the tele -robot    608

600                        FIG. 6

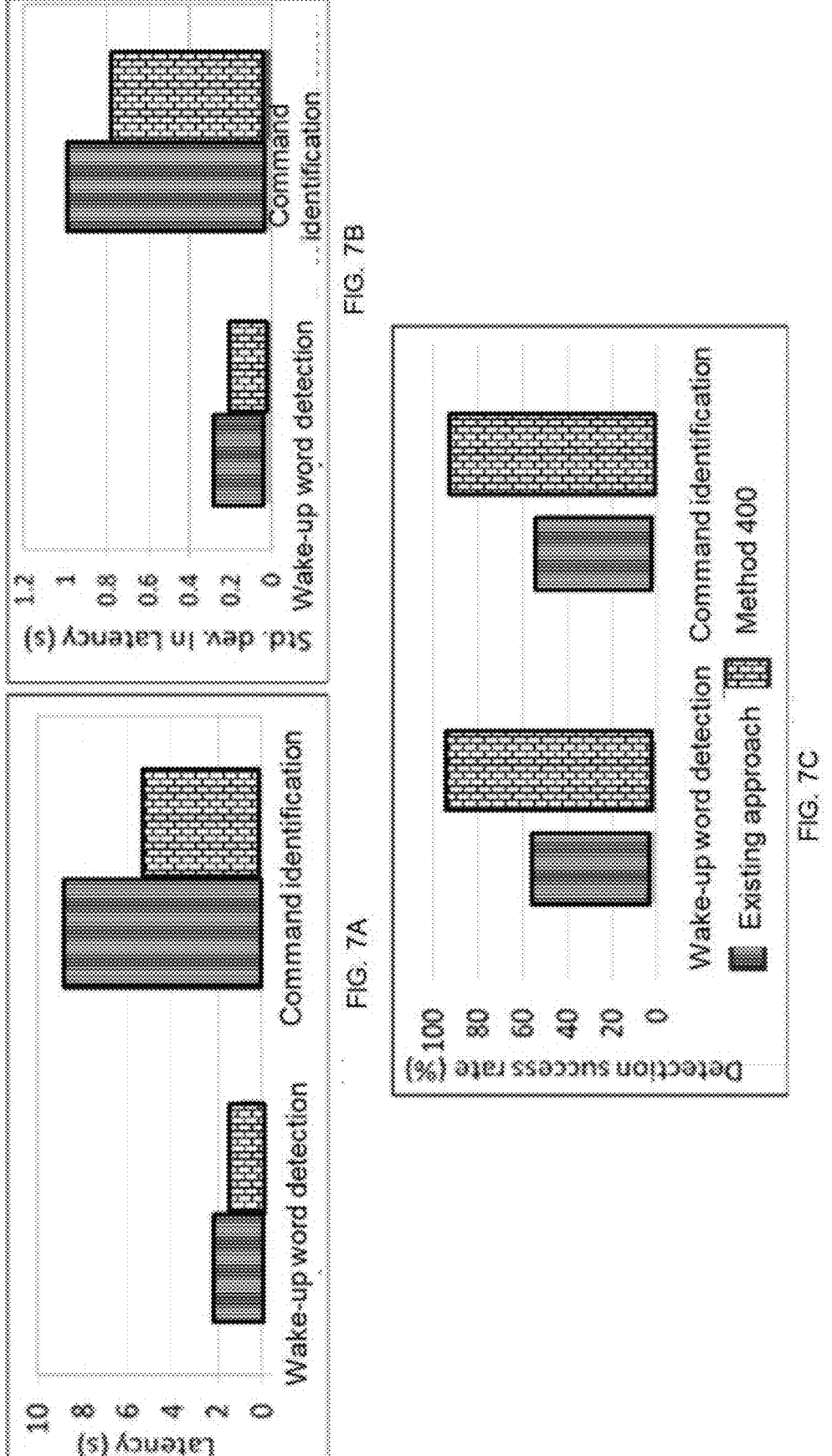

SYSTEM AND METHOD FOR VOICE BASED CONTROLLING A TELE-ROBOT IN A MULTI-USER TELEPRESENCE SESSION

PRIORITY CLAIM

This U.S. patent application claims priority under 35 U.S.C. § 119 to: India Application No. 202421000152, filed on Jan. 2, 2024. The entire contents of the aforementioned application are incorporated herein by reference.

TECHNICAL FIELD

The disclosure herein generally relates to robotics, and, more particularly, to a method and system for robotic task execution in robotic telepresence systems.

BACKGROUND

An implicit expectation from human-robot collaboration environment is that the robot's embodied Artificial Intelligence (AI) should be designed with an 'empathetic' philosophy. In other words, the robot's software intelligence needs to ensure that the robot behaves in a humane manner, such that the robot easily understands the human collaborator's intent and can correlate that to the in-situ environment. This is more so true for robotic telepresence systems. In such systems a remote operator, in real-time, can maneuver a remote Telerobot over the Internet while simultaneously having a two-way multimedia interaction with the remote end where the robot is located. However, providing too much granular instructions to the robot becomes tiresome, and even erroneous due to not having the full context of the environment. This gets exaggerated when the robot is in an environment which is totally unknown to the operator. This calls for embodied intelligence at the robot-side.

In scenarios where remote robots act as companion of human operators, in day-to-day exchanges, verbal communication is the natural way to express our intents and opinions. For example, digital assistants that listen to verbal instructions from a co-located human and execute required task(s). Such models can also be easily replicated for human-robot collaboration in a collocated situation. However, in a Tele-robotic scenario, the operator needs to share the speech command over the Internet to the robot. Such systems enhance the entire technical complexity posed by the real-time communication of the speech along with real-time segregation of commands from normal voice chat (since the operator is also having a multimedia conversation) and understanding of the same.

The complexity further increases when the Telepresence system is extended to support "collaborative multi-presence", in which, multiple human users may join a telepresence session along with the robot, and at any instance, one of them maybe controlling the robot. Existing designs may allow normal voice chat amongst all the participants simultaneously, however, the robots fail to differentiate between operator and observers, and hence may end up executing command from wrong person. Further, in the existing approaches where the automatic speech recognition (ASR) is being performed by the robots, when the operator is giving a voice command, all other users need to remain silent. Otherwise, the ASR fails, which is not an acceptable practice, as it reduces the resultant quality of experience for the entire solution as the resource-constrained robot would soon drain out the energy.

SUMMARY

Embodiments of the present disclosure present technological improvements as solutions to one or more of the above-mentioned technical problems recognized by the inventors in conventional systems. For example, in one embodiment, a robotic telepresence system is provided. The robotic telepresence system includes a plurality of user—WebRTC clients, a session and multimedia cloud, an Automatic Speech Recognition (ASR) cloud, wherein the ASR cloud comprises of an ASR component that is configured to perform automatic speech recognition of speech signals, a tele-robot—WebRTC client, an edge device, and a controller module comprising one or more hardware processors, a memory storing a plurality of instructions, and an Input/Output (I/O) interface between the one or more hardware processors and the memory, wherein, the controller module executes the plurality of instructions via the one or more hardware processors, causing a task execution, by: enabling a speech-command interface and establishing a dedicated secured bidirectional WebSocket P2P connection between the ASR cloud and one of the plurality of user—WebRTC clients identified as an operator client; receiving, by the ASR cloud, a first recorded speech signal for a pre-defined window size from the operator client, wherein if the first recorded speech signal contains a pre-defined wake-up word, the ASR cloud transmits a positive response signal to the operator client; recording, by the operator client, a second speech signal from the operator client, upon receipt of the positive response signal, wherein the second speech signal comprises of a control command for a tele-robot; transmitting the second speech signal to the ASR cloud, by the operator client; generating, by the ASR component in the ASR cloud, an inferred command from the second speech signal, wherein the inferred command is transmitted back to the operator client; obtaining, at the operator client, a validation response indicating whether the inferred command is aligned to the task to be performed; transmitting, by the operator client, the inferred command to the tele-robot—WebRTC client, through a dedicated secured bidirectional P2P WebRTC data channel between the tele-robot—WebRTC client and the operator client, if the validation response indicates that the inferred command is aligned to a task to be performed; triggering the edge device to generate a set of navigation commands from the inferred command, by the tele-robot—WebRTC client, wherein the generated set of navigation commands is transmitted to the tele-robot—WebRTC client; and performing, by the tele-robot—WebRTC client, navigation for the execution of the task, based on the generated set of navigation commands.

In an embodiment of the robotic telepresence system, the first speech signal is transmitted to the ASR cloud after verifying that the first speech signal comprises of a speech-activity.

In an embodiment of the robotic telepresence system, if the wake-up word is not detected in the first speech signal, the operator client prompts re-recording of the first speech signal.

In an embodiment of the robotic telepresence system, each of the plurality of user—WebRTC clients is deployed at a user end, of a plurality of users authorized to control the tele-robot, wherein at any instance, one of the plurality of users who is controlling the tele-robot is the operator, and all users other than the operator from among the plurality of users are observers.

In an embodiment of the robotic telepresence system, The robotic telepresence system as claimed in claim 1 enables recognition of speech signals at the ASR cloud, causing energy saving at the tele-robot.

In an embodiment of the robotic telepresence system, obtaining the validation response comprises: recording a voice message containing one of a) 'yes' and b) 'no', by the operator client; transmitting, by the operator client, the recorded voice message to the ASR cloud; and receiving, from the ASR cloud, a text message with one of 'yes' and 'no' inferred from the voice message, wherein the text message is the validation response.

In an embodiment of the robotic telepresence system, a) transmitting speech signal from the operator client to the ASR cloud through the established dedicated secured bidirectional WebSocket P2P connection between the ASR cloud and one of the plurality of user—WebRTC clients identified as the operator client, and b) transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot.

In an embodiment of the robotic telepresence system, the edge device generates the set of navigation commands from the inferred command, by: identifying, by an image grounding module of the edge device, a targeted object in Field of View (FoV) of the tele-robot, by processing a live video feed obtained from the tele-robot; determining a centroid of the targeted object, by the image grounding module, wherein the determined centroid is transmitted to a navigation command processing module of the edge device; converting, by the navigation command processing module, the centroid of each the targeted object to a 2-Dimensional (2D) mapping on a surface in the FoV of the tele-robot; and generating, by the navigation command processing module, the set of navigation commands, from the 2D mapping, wherein the set of navigation commands comprises of a plurality of way-points to navigate the tele-robot.

In an embodiment of the robotic telepresence system, location of the ASR cloud is selected to be closer to location of the operator client, causing reduction in latency in data transmission between the ASR cloud and the operator client.

In another embodiment, a processor implemented method is provided. The method includes: enabling a speech-command interface and establishing a dedicated secured bidirectional WebSocket P2P connection between the ASR cloud and one of the plurality of user—WebRTC clients identified as an operator client; receiving, by the ASR cloud, a first recorded speech signal for a pre-defined window size from the operator client, wherein if the first recorded speech signal contains a pre-defined wake-up word, the ASR cloud transmits a positive response signal to the operator client; recording, by the operator client, a second speech signal from the operator client, upon receipt of the positive response signal, wherein the second speech signal comprises of a control command for a tele-robot; transmitting the second speech signal to the ASR cloud, by the operator client; generating, by the ASR component in the ASR cloud, an inferred command from the second speech signal, wherein the inferred command is transmitted back to the operator client; obtaining, at the operator client, a validation response indicating whether the inferred command is aligned to the task to be performed; transmitting, by the operator client, the inferred command to the tele-robot—WebRTC client, through a dedicated secured bidirectional P2P WebRTC data channel between the tele-robot—WebRTC client and the operator client, if the validation response indicates that the inferred command is aligned to a task to be performed; triggering the edge device to generate a set of navigation commands from the inferred command, by the tele-robot—WebRTC client, wherein the generated set of navigation commands is transmitted to the tele-robot—WebRTC client; and performing, by the tele-robot—WebRTC client, navigation for the execution of the task, based on the generated set of navigation commands.

In an embodiment of the method, the first speech signal is transmitted to the ASR cloud after verifying that the first speech signal comprises of a speech-activity.

In another embodiment of the method, if the wake-up word is not detected in the first speech signal, the operator client prompts re-recording of the first speech signal.

In another embodiment of the method, each of the plurality of user—WebRTC clients is deployed at a user end, of a plurality of users authorized to control the tele-robot, wherein at any instance, one of the plurality of users who is controlling the tele-robot is the operator, and all users other than the operator from among the plurality of users are observers.

In another embodiment, the method enables recognition of speech signals at the ASR cloud, causing energy saving at the tele-robot.

In another embodiment of the method, obtaining the validation response comprises: recording a voice message containing one of a) 'yes' and b) 'no', by the operator client; transmitting, by the operator client, the recorded voice message to the ASR cloud; and receiving, from the ASR cloud, a text message with one of 'yes' and 'no' inferred from the voice message, wherein the text message is the validation response.

In another embodiment of the method, a) transmitting speech signal from the operator client to the ASR cloud through the established dedicated secured bidirectional WebSocket P2P connection between the ASR cloud and one of the plurality of user—WebRTC clients identified as the operator client, and b) transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot.

In another embodiment of the method, generating the set of navigation commands from the inferred command by the edge device comprises: identifying, by an image grounding module of the edge device, a targeted object in Field of View (FoV) of the tele-robot, by processing a live video feed obtained from the tele-robot; determining a centroid of the targeted object, by the image grounding module, wherein the determined centroid is transmitted to a navigation command processing module of the edge device; converting, by the navigation command processing module, the centroid of each the targeted object to a 2-Dimensional (2D) mapping on a surface in the FoV of the tele-robot; and generating, by the navigation command processing module, the set of navigation commands, from the 2D mapping, wherein the set of navigation commands comprises of a plurality of way-points to navigate the tele-robot.

In another embodiment of the method, location of the ASR cloud is selected to be closer to location of the operator client, causing reduction in latency in data transmission between the ASR cloud and the operator client.

In yet another aspect, a non-transitory computer readable medium is provided. The non-transitory computer readable medium includes a plurality of instructions, which when executed, causes: enabling a speech-command interface and establishing a dedicated secured bidirectional WebSocket P2P connection between the ASR cloud and one of the plurality of user—WebRTC clients identified as an operator client; receiving, by the ASR cloud, a first recorded speech signal for a pre-defined window size from the operator client, wherein if the first recorded speech signal contains a pre-defined wake-up word, the ASR cloud transmits a positive response signal to the operator client; recording, by the operator client, a second speech signal from the operator client, upon receipt of the positive response signal, wherein the second speech signal comprises of a control command for a tele-robot; transmitting the second speech signal to the ASR cloud, by the operator client; generating, by the ASR component in the ASR cloud, an inferred command from the second speech signal, wherein the inferred command is transmitted back to the operator client; obtaining, at the operator client, a validation response indicating whether the inferred command is aligned to the task to be performed; transmitting, by the operator client, the inferred command to the tele-robot—WebRTC client, through a dedicated secured bidirectional P2P WebRTC data channel between the tele-robot—WebRTC client and the operator client, if the validation response indicates that the inferred command is aligned to a task to be performed; triggering the edge device to generate a set of navigation commands from the inferred command, by the tele-robot—WebRTC client, wherein the generated set of navigation commands is transmitted to the tele-robot—WebRTC client; and performing, by the tele-robot—WebRTC client, navigation for the execution of the task, based on the generated set of navigation commands.

In an embodiment of the non-transitory computer readable medium, the first speech signal is transmitted to the ASR cloud after verifying that the first speech signal comprises of a speech-activity.

In another embodiment of the non-transitory computer readable medium, if the wake-up word is not detected in the first speech signal, the operator client prompts re-recording of the first speech signal.

In another embodiment of the non-transitory computer readable medium, each of the plurality of user—WebRTC clients is deployed at a user end, of a plurality of users authorized to control the tele-robot, wherein at any instance, one of the plurality of users who is controlling the tele-robot is the operator, and all users other than the operator from among the plurality of users are observers.

In another embodiment, the non-transitory computer readable medium enables recognition of speech signals at the ASR cloud, causing energy saving at the tele-robot.

In another embodiment of the non-transitory computer readable medium, obtaining the validation response comprises: recording a voice message containing one of a) 'yes' and b) 'no', by the operator client; transmitting, by the operator client, the recorded voice message to the ASR cloud; and receiving, from the ASR cloud, a text message with one of 'yes' and 'no' inferred from the voice message, wherein the text message is the validation response.

In another embodiment of the non-transitory computer readable medium, a) transmitting speech signal from the operator client to the ASR cloud through the established dedicated secured bidirectional WebSocket P2P connection between the ASR cloud and one of the plurality of user—WebRTC clients identified as the operator client, and b) transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot.

In another embodiment of the non-transitory computer readable medium, generating the set of navigation commands from the inferred command by the edge device comprises: identifying, by an image grounding module of the edge device, a targeted object in Field of View (FoV) of the tele-robot, by processing a live video feed obtained from the tele-robot; determining a centroid of the targeted object, by the image grounding module, wherein the determined centroid is transmitted to a navigation command processing module of the edge device; converting, by the navigation command processing module, the centroid of each the targeted object to a 2-Dimensional (2D) mapping on a surface in the FoV of the tele-robot; and generating, by the navigation command processing module, the set of navigation commands, from the 2D mapping, wherein the set of navigation commands comprises of a plurality of way-points to navigate the tele-robot.

In another embodiment of the non-transitory computer readable medium, location of the ASR cloud is selected to be closer to location of the operator client, causing reduction in latency in data transmission between the ASR cloud and the operator client.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 illustrates a computer implemented method executed by the control module for task execution in the robotic telepresence system of FIG. 1, according to some embodiments of the present disclosure.

FIG. 6 is a flow diagram depicting steps involved in the process of generating a set of navigation commands in the robotic telepresence system of FIG. 1, according to some embodiments of the present disclosure.

FIGS. 7A through 7C depict graphical representation of latency, standard deviation in latency, and detection success rate, for a state of the art approach and method 400, respectively, as part of an experimental validation of the task execution in the robotic telepresence system, in accordance with some embodiments of the present disclosure.

DETAILED DESCRIPTION

Figure 1:
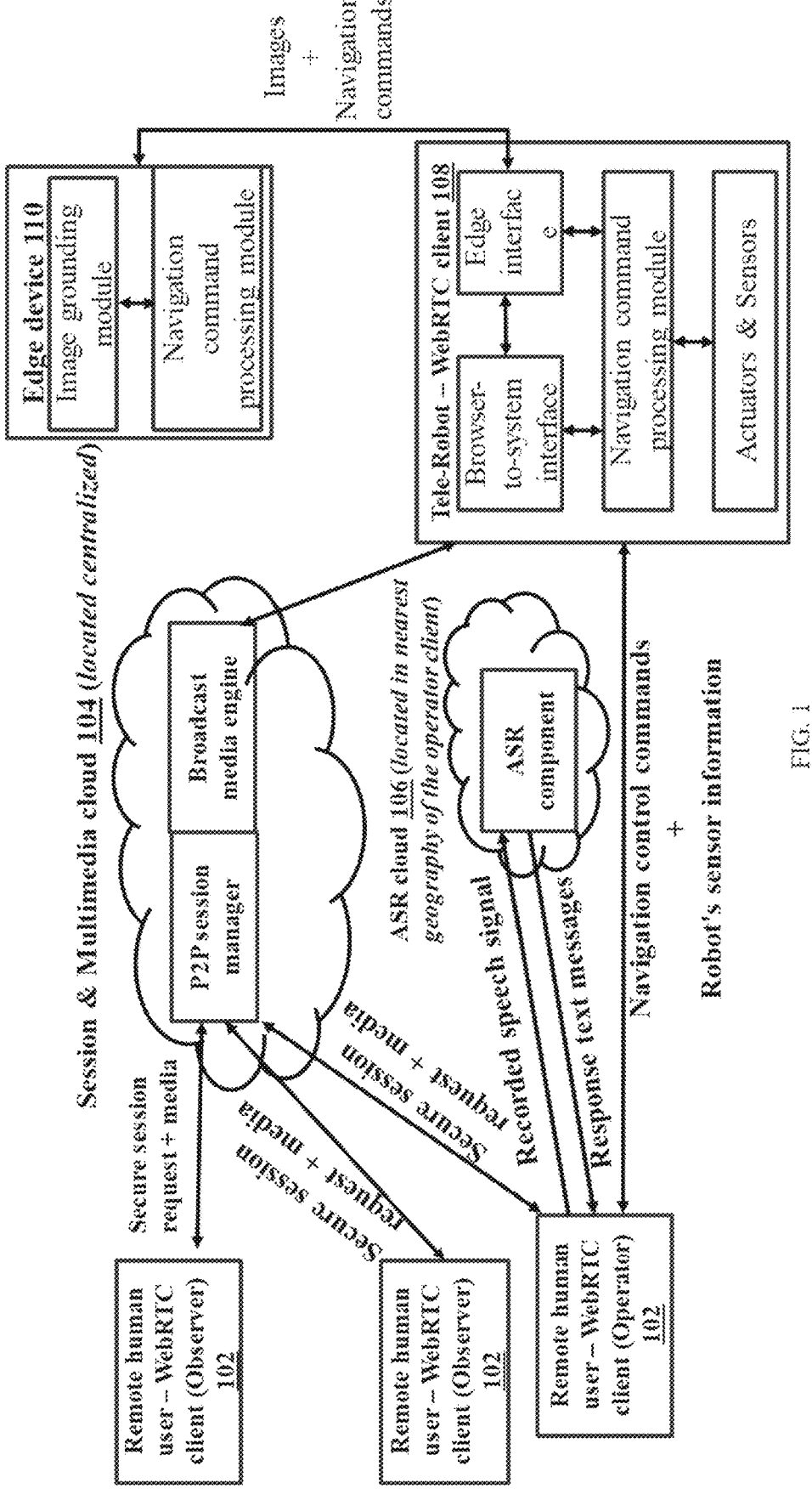
FIG. 1 illustrates an exemplary robotic telepresence system, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Complexity in Telepresence system increases when it is extended to support "collaborative multi-presence", in which, multiple human users may join a telepresence session along with the robot, and at any instance, one of them maybe controlling the robot. Existing designs may allow normal voice chat amongst all the participants simultaneously, however, the robot fails to differentiate between operator and observers, and hence may end up executing command from wrong person. Further, in the existing approaches where the automatic speech recognition (ASR) is being performed by the robot, when the operator is giving a voice command, all others need to remain silent. Otherwise, the ASR fails, which is not an acceptable practice, as it reduces the resultant quality of experience for the entire solution as the resource-constrained robot would soon drain out the energy.

To address these challenges, a telepresence system of the present disclosure addresses the aforementioned challenges by enabling multi-party control of tele-robot. In accordance with the present disclosure, the telepresence system includes a plurality of user—WebRTC clients, a session and multimedia cloud, an Automatic Speech Recognition (ASR) cloud, wherein the ASR cloud comprises of an ASR component that is configured to perform automatic speech recognition of speech signals, a tele-robot—WebRTC client, an edge device, and a controller module comprising one or more hardware processors, a memory storing a plurality of instructions, and an Input/Output (I/O) interface between the one or more hardware processors and the memory, wherein, the controller module executes the plurality of instructions via the one or more hardware processors, causing a task execution, by: enabling a speech-command interface and establishing a dedicated secured bidirectional WebSocket Peer to Peer (P2P) connection between the ASR cloud and one of the plurality of user—WebRTC clients identified as an operator client; receiving, by the ASR cloud, a first recorded speech signal for a pre-defined window size from the operator client, wherein if the first recorded speech signal contains a pre-defined wake-up word, the ASR cloud transmits a positive response signal to the operator client; recording, by the operator client, a second speech signal from the operator client, upon receipt of the positive response signal, wherein the second speech signal comprises of a control command for a tele-robot; transmitting the second speech signal to the ASR cloud, by the operator client; generating, by the ASR component in the ASR cloud, an inferred command from the second speech signal, wherein the inferred command is transmitted back to the operator client; obtaining, at the operator client, a validation response indicating whether the inferred command is aligned to the task to be performed; transmitting, by the operator client, the inferred command to the tele-robot—WebRTC client, through a dedicated secured bidirectional P2P WebRTC data channel between the tele-robot—WebRTC client and the operator client, if the validation response indicates that the inferred command is aligned to a task to be performed; triggering the edge device to generate a set of navigation commands from the inferred command, by the tele-robot—WebRTC client, wherein the generated set of navigation commands is transmitted to the telerobot—WebRTC client; and performing, by the tele-robot—WebRTC client, navigation for the execution of the task, based on the generated set of navigation commands. In the telepresence system of the present disclosure, transmitting speech signal from the operator client to the ASR cloud through the established dedicated secured bidirectional WebSocket P2P connection between the ASR cloud and one of the plurality of user—WebRTC clients identified as the operator client, and transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot.

Referring now to the drawings, and more particularly to FIG. 1 through FIG. 7C, where similar reference characters denote corresponding features consistently throughout the figures, there are shown preferred embodiments and these embodiments are described in the context of the following exemplary system and/or method.

FIG. 1 illustrates an exemplary robotic telepresence system, according to some embodiments of the present disclosure. The robotic telepresence system 100 include a plurality of user—WebRTC clients 102 (alternately referred to as remote human user—WebRTC clients), a session and multimedia cloud 104, an Automatic Speech Recognition (ASR) cloud 106, wherein the ASR cloud comprises of an ASR component, a tele-robot—WebRTC client 108, an edge device 110, and a controller module 112 (not shown).

FIG. 1 illustrates an exemplary robotic telepresence system, according to some embodiments of the present disclosure. The robotic telepresence system 100 include a plurality of user—WebRTC clients 102, a session and multimedia cloud 104, an Automatic Speech Recognition (ASR) cloud 106, wherein the ASR cloud comprises of an ASR component that is configured to perform automatic speech recognition of speech signals, a tele-robot—WebRTC client 108, an edge device 110, and a controller module 112 (not shown).

Figure 2:
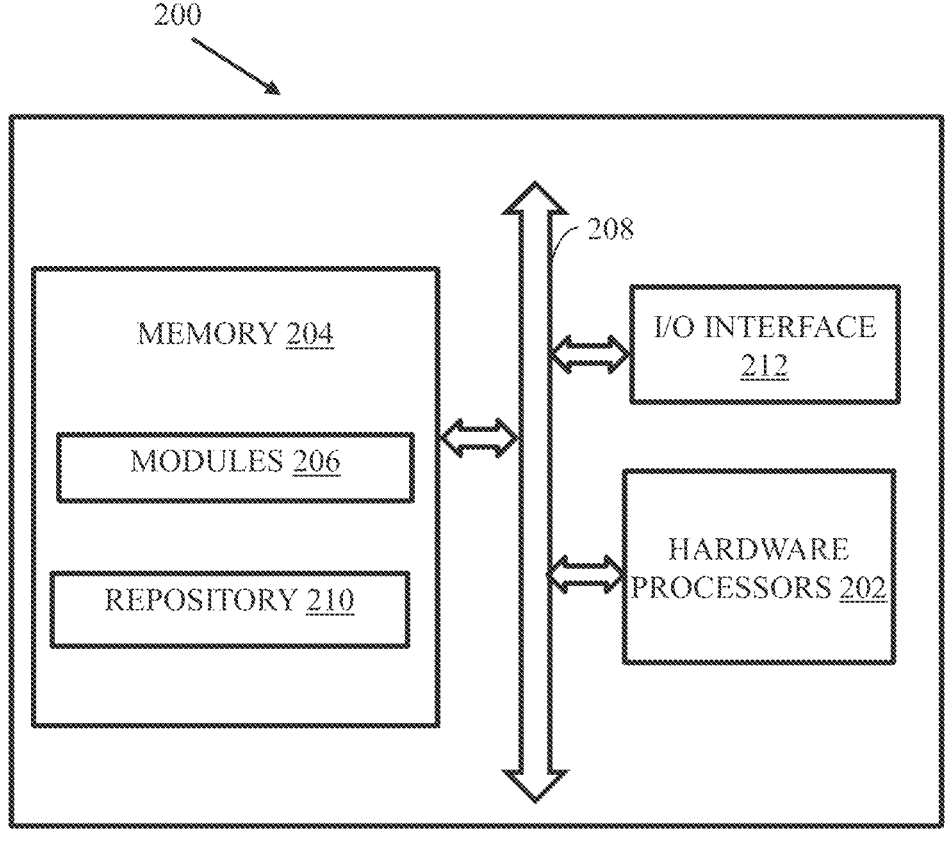
FIG. 2 is a block diagram depicting components of a control module of the robotic telepresence system of FIG. 1, according to some embodiments of the present disclosure.

In various embodiments, the controller module 112 maybe a software component, or a hardware component, or a combination of the hardware and software components. The components of the controller module are depicted in FIG. 2, and are explained hereafter. The controller module 112 includes or is otherwise in communication with hardware processors 202, at least one memory such as a memory 204, an I/O interface 212. The hardware processors 202, memory 204, and the Input/Output (I/O) interface 212 may be coupled by a system bus such as a system bus 208 or a similar mechanism. In an embodiment, the hardware processors 202 can be one or more hardware processors.

The I/O interface 212 may include a variety of software and hardware interfaces, for example, a web interface, a graphical user interface, and the like. The I/O interface 212 may include a variety of software and hardware interfaces, for example, interfaces for peripheral device(s), such as a keyboard, a mouse, an external memory, a printer and the like. Further, the I/O interface 212 may enable the controller module 112 to communicate with other devices, such as web servers, and external databases.

The I/O interface 212 can facilitate multiple communications within a wide variety of networks and protocol types, including wired networks, for example, local area network (LAN), cable, etc., and wireless networks, such as Wireless LAN (WLAN), cellular, or satellite. For this purpose, the I/O interface 212 may include one or more ports for connecting several computing systems with one another or to another server computer. The I/O interface 112 may include one or more ports for connecting several devices to one another or to another server.

The one or more hardware processors 202 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 202 is configured to fetch and execute computer-readable instructions stored in the memory 204.

The memory 204 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 204 includes a plurality of modules 206.

The plurality of modules 206 include programs or coded instructions that supplement applications or functions performed by the controller module 112 for executing different steps involved in the process of task execution in the telepresence robotic network. The plurality of modules 206, amongst other things, can include routines, programs, objects, components, and data structures, which performs particular tasks or implement particular abstract data types. The plurality of modules 206 may also be used as, signal processor(s), node machine(s), logic circuitries, and/or any other device or component that manipulates signals based on operational instructions. Further, the plurality of modules 206 can be used by hardware, by computer-readable instructions executed by the one or more hardware processors 202, or by a combination thereof. The plurality of modules 206 can include various sub-modules (not shown). The plurality of modules 206 may include computer-readable instructions that supplement applications or functions performed by the controller module 112 for the task execution in the telepresence robotic network.

The data repository (or repository) 210 may include a plurality of abstracted piece of code for refinement and data that is processed, received, or generated as a result of the execution of the plurality of modules in the module(s) 206.

Although the data repository 210 is shown internal to the controller module 112, it will be noted that, in alternate embodiments, the data repository 210 can also be implemented external to the controller module 112, where the data repository 210 may be stored within a database (repository 210) communicatively coupled to the controller module 112. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working details of the telepresence system in FIG. 1 are explained with reference to the components of the controller module 112 as depicted in FIG. 2, the state diagrams in FIGS. 3A, 3B, the flow diagrams in FIG. 4, FIG. 5, FIG. 6, and the graphs in FIG. 7A, 7B, 7C.

The steps of the method 400 of the present disclosure will now be explained with reference to the components or blocks of the telepresence system in FIG. 1 and the blocks of the controller module 112 as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 402 of method 400 in FIG. 4, the a speech-command interface is enabled and a dedicated secured bidirectional WebSocket P2P connection is established between the ASR cloud 106 and one of the plurality of user—WebRTC clients 102 identified as an operator client. Location of the ASR cloud 106 is selected to be closer to location of the operator client 102, causing reduction in latency in data transmission between the ASR cloud 106 and the operator client 102. The cloud instance for hosting the ASR component is chosen at the nearest possible location to the operator client dynamically using anycast address to reduce the latency. Each of the plurality of user—WebRTC clients 102 is deployed at a user end, of a plurality of users authorized to control the tele-robot, wherein at any instance, one of the plurality of users who is controlling the tele-robot is the operator, and all users other than the operator from among the plurality of users are observers.

Figure 3A:
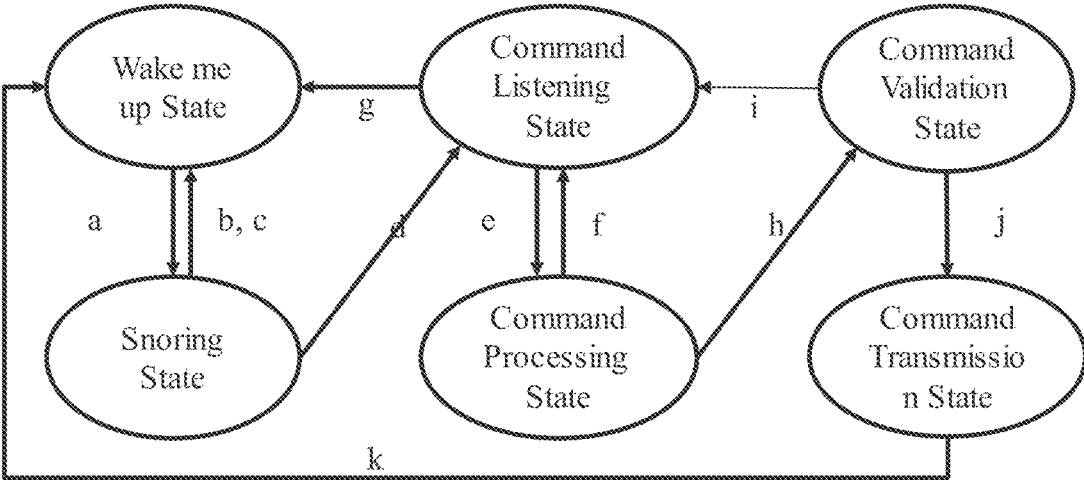
FIGS. 3A and 3B illustrate state diagrams associated with task execution in the robotic telepresence system of FIG. 1, in accordance with some embodiments of the present disclosure.

In an embodiment, one of the plurality of user—WebRTC clients 102 is identified as the operator client when a user of the user—WebRTC clients 102 uses a physical interface on a console of the corresponding user—WebRTC client 102 to enable the speech-command interface. The WebSocket channel is intended to carry voice chunks to the ASR cloud 106 and get back an inference to the speech-command interface. In an embodiment, to conserve bandwidth usage and preserve energy at the operator-end, the console at the operator end toggles between 'snoring' and 'wake me up' states periodically as depicted in FIG. 3A. During the 'wake me up' state, an operator side browser may use a MediaRecorder( ) API in JavaScript to record a small chunk of audio if the audio amplitude is above a threshold and converts it to a stream using the MediaStream( ) API, which forms a first recorded speech signal. In an embodiment of the robotic telepresence system, the first speech signal is transmitted to the ASR cloud after verifying that the first speech signal comprises of a speech-activity. This allows filtering of speech signals that do not contain any speech activity, thereby reducing processing load at the ASR cloud 106.

Further, at step 404 of the method 400, the ASR cloud 106 receives the first recorded speech signal for a pre-defined window size from the operator client. The first recorded speech signal is from a user of the operator client, and is required to have a pre-defined wake-up word for the ASR cloud 106 to allow further recordings at the operator client. If the first recorded speech signal contains the pre-defined wake-up word, the ASR cloud 106 transmits a positive response signal to the operator client. If the first recorded speech signal does not contain the pre-defined wake-up word, the ASR cloud 106 transmits a negative response signal to the operator client. Upon receipt of the negative response, the operator client may terminate ongoing session of speech signal recording, and may then prompt the user to re-record the first speech signal, thereby initiating a new session.

If the positive response is received from the ASR cloud 106, at step 406 of the method 400, the operator client records a second speech signal from the user of the operator client, i.e., the operator client prompts to utter a control command for the tele-robot, in a defined time period, and records it as the second speech signal. The second speech signal includes/contains the control command for the tele-robot. Various control commands may be related to various functions of the tele-robot, for the purpose of executing the task and are pre-defined and stored in an associated database. For example, the control commands maybe directed to navigation of the tele-robot, such as "go to the door". In another example, the control commands maybe directed to an action to be performed by the tele-robot, for example, 'pick up an object'.

At step 408 of the method 400, the operator client transmits the second speech signal to the ASR cloud 106, through the WebSocket channel. The ASR component in the ASR cloud 106 may use data in an associated dictionary to process and interpret the second speech signal to interpret the control command at step 410 of the method 400, thereby generating an inferred command, which is then transmitted back to the operator client. The dictionary maybe populated with a set of pre-defined commands (e.g., move forward, turn right, turn left, move back, stop) and with information on various objects (e.g., computer, laptop, chair, board, door, person, sofa, etc.).

Further, at step 412 of the method 400, a validation response is obtained at the operator client, which indicates whether the generated inferred command is aligned to the task to be performed. Various steps involved in the process of obtaining the validation response are depicted in method 500 in FIG. 5, and are explained hereafter. At this stage, the operator client may display the generated inferred command to the user (operator) via a suitable user interface, and may then provide an option and interface for the user to confirm, in the form the validation response, whether the generated inferred command is aligned to the task to be performed. At step 502 of the method 500, the operator client 102 may record a voice message containing one of a) 'yes' and b) 'no'. Further, at step 504 of the method 500, the operator client 102 transmits the recorded voice message to the ASR cloud 106. Further, at step 506 of the method 500, the operator client 102 receives, from the ASR cloud 106, a text message with one of 'yes' and 'no' inferred from the voice message, wherein the text message is the validation response, where a response 'yes' indicates that the inferred command is aligned to the task, and a response 'no' indicates that the inferred command is not aligned to the task. If the inferred command is not aligned to the task, then the inferred command, if used to control the tele-robot, may not serve intended purpose, i.e., intended action may not get executed. Upon receiving a user feedback indicating that the inferred command is not aligned to the task to be performed, steps 406 through 410 maybe repeated, till the time the user confirms that the generated inferred command is aligned to the task to be performed, but not beyond a pre-defined number of iterations.

Upon receiving confirmation that the generated inferred command is aligned to the task to be performed, at step 414 of the method 400, the operator client transmits the inferred command to the tele-robot—WebRTC client through a dedicated secured bidirectional P2P WebRTC data channel between the tele-robot—WebRTC client and the operator client. The transmitting speech signal from the operator client to the ASR cloud through the established dedicated secured bidirectional WebSocket P2P connection between the ASR cloud and one of the plurality of user—WebRTC clients identified as the operator client, and the transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot. In an embodiment, recognition of speech signals at the ASR cloud causes energy saving at tele-robot. In various embodiments, the tele-robot—WebRTC client 108 is internal or external to the robot, and is a component controlling movements and actions of the tele-robot towards achieving the execution of the task.

Further, at step 416 of the method 400, the tele-robot—WebRTC client 108 triggers the edge device 110 to generate a set of navigation commands from the inferred command. Various steps involved in the process of generating the set of navigation commands are depicted in method 600 in FIG. 6, and are explained hereafter. At this stage, a navigation command processing module of the edge device 110 parses the inferred command and the associated object where the tele-robot is intended to go. The tele-robot's Field of View (FoV) maybe continuously streamed to the edge device 110. At step 602 of the method 600, an image grounding module of the edge device 110 identifies target object in the frames corresponding to the timestamps around a request, by processing a live video feed obtained from the tele-robot. Further, at step 604 of the method 600, a centroid of the targeted object is determined by the image grounding module, wherein the determined centroid is transmitted to a navigation command processing module. Further, at step 606 of the method 600, the navigation command processing module converts the centroid into a 2-Dimensional (2D) mapping on a surface in the FoV of the tele-robot. Further, at step 608 of the method 600, the navigation command processing module generates the set of navigation commands, from the 2D mapping, wherein the set of navigation commands comprises of a plurality of way-points to navigate the tele-robot. For the navigation processes, a robot operating system (ROS) is used. The generated set of navigation commands is transmitted to the tele-robot—WebRTC client 108. Further, at step 418 of the method 400, the tele-robot—WebRTC client 108 performs navigation for the execution of the task, based on the generated set of navigation commands.

Figure 3B:
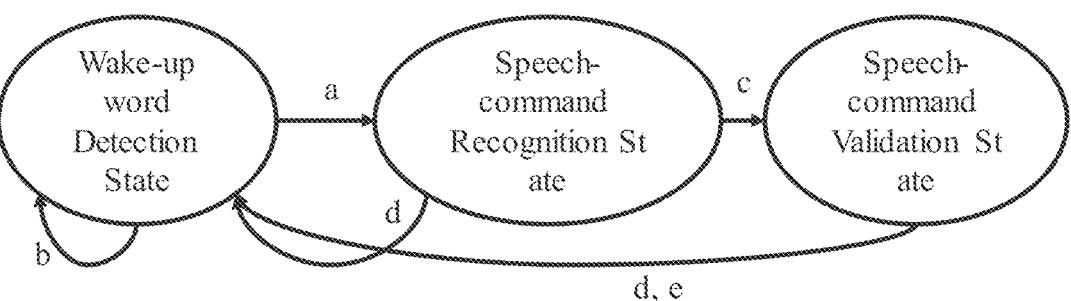
Figure 5:
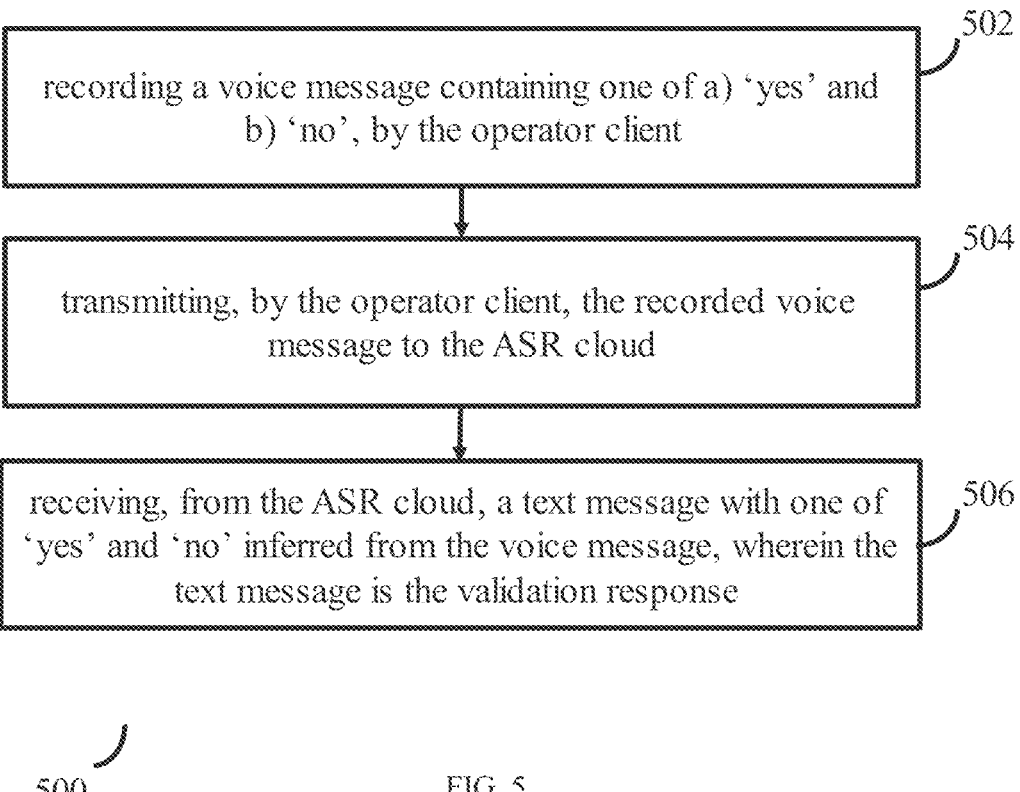
FIG. 5 is a flow diagram depicting steps involved in the process of obtaining a validation response for an inferred command, in the robotic telepresence system of FIG. 1, according to some embodiments of the present disclosure.

The sequence of steps is further depicted using the state diagrams in FIGS. 3A and 3B. State transitions happening at the operator client side are depicted in FIG. 3A, and each state change is given below.

a→Operator client sends the recorded first speech signal to ASR cloud 106 containing wake-up word, b→'No wake-up word detected' response is received at the operator client from the ASR cloud 106, c→Operator client does not receive any response from ASR cloud 106 within time-out interval started from latest request sent, d→'Wake-up word detected' response is received at the operator client from the ASR cloud 106, e→Operator client sends the recorded second speech signal containing control command to the ASR cloud 106, f→Operator client does not receive any response from the ASR cloud within time-out interval started from latest request sent, g→Operator client fails to process the second speech signal containing the control command even after a certain number of trials, h→Response containing the control command (as text) is received to the operator client from the ASR cloud 106, i→Operator client sends the validation response to the ASR cloud 106 and gets either a text-response back as 'No' or no response from the ASR cloud 106 within a certain time-out interval started from latest state-change, j→Operator client sends the recorded audio containing the 'Yes/No' statement for validation to the ASR cloud 106 and gets a text-response back as 'Yes' from ASR, k→Operator client sends the speech-command (in text format) to the tele-robot through the P2P channel.

Similarly, the state changes/transitions at the ASR cloud 106 are depicted in FIG. 3B, and each state change is given below.

A→Wake-up word is detected from the speech signal received from the operator client and a text message 'wake-up word detected' is responded back, b→Wake-up word is not detected, c→Control command is recognised from the speech signal received and responded back as text to the operator client, d→ASR cloud does not receive any speech-signal or not able to recognize it within a certain time-out interval starting from latest state-changing timestamp, e→Control command is validated from the received speech signal containing confirmation ('Yes'/'No') statement.

During experiments, latency was measured for a) wake-up word detection, and b) command identification. Latency for wake-up word detection is measured as difference between the timestamp while operator is saying the wake-up word and the timestamp while operator has received the response from the ASR cloud 106. Similarly, latency for command identification is measured as the difference between the timestamp while operator is saying control command (voice based) and timestamp while validation response of the intended command is informed to the operator. This experiment was repeated over 10 users across multiple geographies.

Average latency between a state-of-the-art approach and the method 400 for both a) wake-up word detection and b) command identification, were compared, which are depicted in FIG. 7A, and standard deviation for the same are depicted in FIG. 7B. In both cases, a significant performance improvement was observed. In FIG. 7C, an observed significant improvement in detection success rate of the method 400 over the state-of-the-art approach for both a) wake-up word detection, and b) command identification are depicted.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of robotic control in a multi-party environment. The embodiment, thus provides a mechanism of inferring commands at operator end and transmitting only the inferred command to the tele-robot via a dedicated channel established between the tele-robot and the operator. Moreover, the embodiments herein further provide a mechanism of controlling the tele-robot based on the received inferred command.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A robotic telepresence system, comprising:

a session and multimedia cloud configured to communicate with a plurality of user—WebRTC clients and a tele-robot—WebRTC client;

an Automatic Speech Recognition (ASR) cloud, wherein the ASR cloud comprises of an ASR component that is configured to perform automatic speech recognition of speech signals, and is configured to communicate with one of a plurality of user—WebRTC clients identified as an operator client;

the plurality of user—WebRTC clients configured to communicate with a session and multimedia cloud, the ASR cloud, and the tele-robot—WebRTC client, wherein only the user—WebRTC client identified as the operator client communicates with the ASR cloud and the tele-robot—WebRTC client at any instance;

the tele-robot—WebRTC client configured to communicate with the operator client, the session and multimedia cloud, and an edge device;

the edge device configured to communicate with the tele-robot—WebRTC client; and a controller module configured to communicate with the plurality of user—WebRTC clients, the session and multimedia cloud, the Automatic Speech Recognition (ASR) cloud, the tele-robot—WebRTC client, and the edge device, wherein the controller module comprises of one or more hardware processors, a memory storing a plurality of instructions, and an Input/Output (I/O) interface between the one or more hardware processors and the memory, wherein, the controller module executes the plurality of instructions via the one or more hardware processors, causing a task execution, by:

enabling a speech-command interface and establishing a dedicated secured bidirectional WebSocket P2P connection between the ASR cloud and one of the plurality of user—WebRTC clients identified as an operator client;

receiving, by the ASR cloud, a first recorded speech signal for a pre-defined window size from the operator client, wherein if the first recorded speech signal contains a pre-defined wake-up word, the ASR cloud transmits a positive response signal to the operator client;

recording, by the operator client, a second speech signal from the operator client, upon receipt of the positive response signal, wherein the second speech signal comprises of a control command for a tele-robot;

transmitting the second speech signal to the ASR cloud, by the operator client;

generating, by the ASR component in the ASR cloud, an inferred command from the second speech signal, wherein the inferred command is transmitted back to the operator client;

obtaining, at the operator client, a validation response indicating whether the inferred command is aligned to the task to be performed;

transmitting, by the operator client, the inferred command to the tele-robot—WebRTC client, through a dedicated secured bidirectional P2P WebRTC data channel between the tele-robot—WebRTC client and the operator client, if the validation response indicates that the inferred command is aligned to a task to be performed;

triggering the edge device to generate a set of navigation commands from the inferred command, by the tele-robot—WebRTC client, wherein the generated set of navigation commands is transmitted to the tele-robot—WebRTC client; and performing, by the tele-robot—WebRTC client, navigation for the execution of the task, based on the generated set of navigation commands.

2. The robotic telepresence system of claim 1, wherein the first speech signal is transmitted to the ASR cloud after verifying that the first speech signal comprises of a speech-activity.

3. The robotic telepresence system of claim 1, wherein if the wake-up word is not detected in the first speech signal, the operator client prompts re-recording of the first speech signal.

4. The robotic telepresence system of claim 1, wherein each of the plurality of user—WebRTC clients is deployed at a user end, of a plurality of users authorized to control the tele-robot, wherein at any instance, one of the plurality of users who is controlling the tele-robot is the operator, and all users other than the operator from among the plurality of users are observers.

5. The robotic telepresence system of claim 1 enables recognition of speech signals at the ASR cloud, causing energy saving at the tele-robot.

6. The robotic telepresence system of claim 1, wherein obtaining the validation response comprises:

recording a voice message containing one of a) 'yes' and b) 'no', by the operator client;

transmitting, by the operator client, the recorded voice message to the ASR cloud; and receiving, from the ASR cloud, a text message with one of 'yes' and 'no' inferred from the voice message, wherein the text message is the validation response.

7. The telepresence robot of claim 1, wherein a) transmitting speech signal from the operator client to the ASR cloud through the established dedicated secured bidirectional WebSocket P2P connection between the ASR cloud and one of the plurality of user—WebRTC clients identified as the operator client, and b) transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot.

8. The robotic telepresence system of claim 1, wherein the edge device generates the set of navigation commands from the inferred command, by:

identifying, by an image grounding module of the edge device, a targeted object in Field of View (FoV) of the tele-robot, by processing a live video feed obtained from the tele-robot;

determining a centroid of the targeted object, by the image grounding module, wherein the determined centroid is transmitted to a navigation command processing module of the edge device;

converting, by the navigation command processing module, the centroid of the targeted object to a 2-Dimensional (2D) mapping on a surface in the FoV of the tele-robot; and generating, by the navigation command processing module, the set of navigation commands, from the 2D mapping, wherein the set of navigation commands comprises of a plurality of way-points to navigate the tele-robot.

9. The robotic telepresence system of claim 1, wherein location of the ASR cloud is selected to be closer to location of the operator client, causing reduction in latency in data transmission between the ASR cloud and the operator client.

10. A processor implemented method, comprising:

enabling a speech-command interface and establishing a dedicated secured bidirectional WebSocket P2P connection between the ASR cloud and one of the plurality of user—WebRTC clients identified as an operator client;

receiving, by the ASR cloud, a first recorded speech signal for a pre-defined window size from the operator client, wherein if the first recorded speech signal contains a pre-defined wake-up word, the ASR cloud transmits a positive response signal to the operator client;

recording, by the operator client, a second speech signal from the operator client, upon receipt of the positive response signal, wherein the second speech signal comprises of a control command for a tele-robot;

transmitting the second speech signal to the ASR cloud, by the operator client;

generating, by the ASR component in the ASR cloud, an inferred command from the second speech signal, wherein the inferred command is transmitted back to the operator client;

obtaining, at the operator client, a validation response indicating whether the inferred command is aligned to the task to be performed;

transmitting, by the operator client, the inferred command to the tele-robot—WebRTC client, through a dedicated secured bidirectional P2P WebRTC data channel between the tele-robot—WebRTC client and the operator client, if the validation response indicates that the inferred command is aligned to a task to be performed;

triggering the edge device to generate a set of navigation commands from the inferred command, by the tele-robot—WebRTC client, wherein the generated set of navigation commands is transmitted to the tele-robot—WebRTC client; and performing, by the tele-robot—WebRTC client, navigation for the execution of the task, based on the generated set of navigation commands.

11. The method of claim 10, wherein the first speech signal is transmitted to the ASR cloud after verifying that the first speech signal comprises of a speech-activity.

12. The method of claim 10, wherein if the wake-up word is not detected in the first speech signal, the operator client prompts re-recording of the first speech signal.

13. The method of claim 10, wherein each of the plurality of user—WebRTC clients is deployed at a user end, of a plurality of users authorized to control the tele-robot, wherein at any instance, one of the plurality of users who is controlling the tele-robot is the operator, and all users other than the operator from among the plurality of users are observers.

14. The method of claim 10 enables recognition of speech signals at the ASR cloud, causing energy saving at the tele-robot.

15. The method of claim 10, wherein obtaining the validation response comprises:

recording a voice message containing one of a) 'yes' and b) 'no', by the operator client;

transmitting, by the operator client, the recorded voice message to the ASR cloud; and receiving, from the ASR cloud, a text message with one of 'yes' and 'no' inferred from the voice message, wherein the text message is the validation response.

16. The method of 10, wherein a) transmitting speech signal from the operator client to the ASR cloud through the established dedicated secured bidirectional WebSocket P2P connection between the ASR cloud and one of the plurality of user—WebRTC clients identified as the operator client, and b) transmitting the inferred command to the tele-robot—WebRTC client, through a dedicated secured bidirectional P2P WebRTC data channel between the tele-robot—WebRTC client and the operator client, causes the tele-robot to differentiate between the speech signal from the operator and the plurality of observers, enabling source separation of the speech signals at the tele-robot.

17. The method of claim 10, wherein generating the set of navigation commands from the inferred command by the edge device comprises:

identifying, by an image grounding module of the edge device, a targeted object in Field of View (FoV) of the tele-robot, by processing a live video feed obtained from the tele-robot;

determining a centroid of the targeted object, by the image grounding module, wherein the determined centroid is transmitted to a navigation command processing module of the edge device;

converting, by the navigation command processing module, the centroid of the targeted object to a 2-Dimensional (2D) mapping on a surface in the FoV of the tele-robot; and generating, by the navigation command processing module, the set of navigation commands, from the 2D mapping, wherein the set of navigation commands comprises of a plurality of way-points to navigate the tele-robot.

18. The method of claim 10, wherein location of the ASR cloud is selected to be closer to location of the operator client, causing reduction in latency in data transmission between the ASR cloud and the operator client.

19. One or more non-transitory machine-readable information storage mediums comprising one or more instructions which when executed by one or more hardware processors cause a task execution, by:

enabling a speech-command interface and establishing a dedicated secured bidirectional WebSocket P2P connection between an Automatic Speech Recognition (ASR) cloud, and one of a plurality of user—WebRTC clients identified as an operator client;

receiving, by the ASR cloud, a first recorded speech signal for a pre-defined window size from the operator client, wherein if the first recorded speech signal contains a pre-defined wake-up word, the ASR cloud transmits a positive response signal to the operator client;

recording, by the operator client, a second speech signal from the operator client, upon receipt of the positive response signal, wherein the second speech signal comprises of a control command for a tele-robot;

transmitting the second speech signal to the ASR cloud, by the operator client;

generating, by an ASR component in the ASR cloud, an inferred command from the second speech signal, wherein the inferred command is transmitted back to the operator client;

obtaining, at the operator client, a validation response indicating whether the inferred command is aligned to the task to be executed;

transmitting, by the operator client, the inferred command to a tele-robot—WebRTC client, through a dedicated secured bidirectional P2P WebRTC data channel between the tele-robot—WebRTC client and the operator client, if the validation response indicates that the inferred command is aligned to the task to be executed;

triggering an edge device to generate a set of navigation commands from the inferred command, by the tele-robot—WebRTC client, wherein the generated set of navigation commands is transmitted to the tele-robot—WebRTC client; and performing, by the tele-robot—WebRTC client, navigation for the execution of the task, based on the generated set of navigation commands.

* * * * *